(12) United States Patent
Gautam et al.

(10) Patent No.: US 12,080,068 B2
(45) Date of Patent: Sep. 3, 2024

(54) DEEP LEARNING SYSTEM FOR DETERMINING AUDIO RECOMMENDATIONS BASED ON VIDEO CONTENT

(71) Applicant: Adobe Inc., San Jose, CA (US)

(72) Inventors: Karunakar Gautam, New Delhi (IN); Rahul Gandhi, New Delhi (IN); Anandita Chopra, Patiala (IN)

(73) Assignee: Adobe Inc., San Jose, CA (US)

( * ) Notice: Subject to any disclaimer, the term of this patent is extended or adjusted under 35 U.S.C. 154(b) by 424 days.

(21) Appl. No.: 17/361,014

(22) Filed: Jun. 28, 2021

(65) Prior Publication Data

US 2022/0414381 A1 Dec. 29, 2022

(51) Int. Cl.
*G06V 20/40* (2022.01)
*G06F 16/64* (2019.01)
(Continued)

(52) U.S. Cl.
CPC .............. *G06V 20/46* (2022.01); *G06F 16/64* (2019.01); *G06F 18/214* (2023.01);
(Continued)

(58) Field of Classification Search
CPC ...... G06F 16/64; G06F 18/214; G06F 18/217; G06F 18/253; G06N 3/045; G06N 3/0464; G06N 3/08; G06N 3/084; G06V 20/41; G06V 20/46; G10H 1/0008; G10H 1/368; G10H 2210/021; G10H 2220/455;
(Continued)

(56) References Cited

U.S. PATENT DOCUMENTS

2019/0110103 A1* 4/2019 el Kaliouby .......... G06V 40/176
2019/0163274 A1* 5/2019 Sun ........................ G06V 20/20
(Continued)

OTHER PUBLICATIONS

Jen-Chun Lin, "Automatic Music Video Generation Based on Simultaneous Soundtrack Recommendation and Video Editing," Oct. 19, 2017, MM'17, Oct. 23-27, 2017, Mountain View, CA, USA ,pp. 519-525.*

(Continued)

*Primary Examiner* — Omar S Ismail
(74) *Attorney, Agent, or Firm* — Nicholson De Vos Webster & Elliott LLP

(57) ABSTRACT

Embodiments are disclosed for determining an answer to a query associated with a graphical representation of data. In particular, in one or more embodiments, the disclosed systems and methods comprise receiving an input including an unprocessed audio sequence and a request to perform an audio signal processing effect on the unprocessed audio sequence. The one or more embodiments further include analyzing, by a deep encoder, the unprocessed audio sequence to determine parameters for processing the unprocessed audio sequence. The one or more embodiments further include sending the unprocessed audio sequence and the parameters to one or more audio signal processing effects plugins to perform the requested audio signal processing effect using the parameters and outputting a processed audio sequence after processing of the unprocessed audio sequence using the parameters of the one or more audio signal processing effects plugins.

20 Claims, 10 Drawing Sheets

(51) Int. Cl.
  *G06F 18/21* (2023.01)
  *G06F 18/214* (2023.01)
  *G06F 18/25* (2023.01)
  *G06N 3/08* (2023.01)
  *G10L 19/02* (2013.01)

(52) U.S. Cl.
  CPC .......... *G06F 18/217* (2023.01); *G06F 18/253* (2023.01); *G06N 3/08* (2013.01); *G06V 20/41* (2022.01); *G10L 19/02* (2013.01)

(58) Field of Classification Search
  CPC ....... G10H 2240/085; G10H 2240/141; G10H 2250/311; G10L 19/02; G10L 25/30; G10L 25/57; H04N 21/233; H04N 21/23418; H04N 21/251
  See application file for complete search history.

(56) References Cited

U.S. PATENT DOCUMENTS

| | | | |
|---|---|---|---|
| 2020/0005046 A1* | 1/2020 | Attorre | G06T 7/0002 |
| 2020/0021873 A1* | 1/2020 | Swaminathan | H04N 21/466 |
| 2020/0129860 A1* | 4/2020 | Adams | G06N 3/044 |
| 2020/0134316 A1* | 4/2020 | Krishnamurthy | G06V 20/70 |
| 2020/0134929 A1* | 4/2020 | Krishnamurthy | G06T 19/20 |
| 2020/0135052 A1* | 4/2020 | Singh | A63F 13/52 |
| 2020/0137463 A1* | 4/2020 | Kumar | G06N 3/045 |
| 2020/0311475 A1* | 10/2020 | el Kaliouby | G06V 10/764 |
| 2020/0342234 A1* | 10/2020 | Gan | G06V 20/46 |

OTHER PUBLICATIONS

Marco Cristani,"Audio-Visual Event Recognition in Surveillance Video Sequences," Jan. 22, 2007, IEEE Transactions on Multimedia, vol. 9, No. 2, Feb. 2007, pp. 257-264.*

Tomoyasu Nakano,"Dancereproducer: An Automatic Mashup Music Video Generation System by Reusing Dance Video Clips on the Web," Jul. 2011, Proc. of the 8th Sound and Music Computing Conference (SMC 2011),Jul. 6-9, 2011, Padova-Italy, Pa.*

Zhu Liu,"Audio Feature Extraction and Analysis for Scene Segmentation and Classification," Oct. 1, 1998,Journal of VLSI Signal Processing 20, 61-79 (1998), pp. 62-75.*

Fatemeh Noroozi,"Audio-Visual Emotion Recognition in Video Clips," Mar. 7, 2019,IEEE Transactions on Affective Computing, vol. 10, No. 1, Jan.-Mar. 2019,pp. 60-70.*

Yao Wang,"Multimedia Content Analysis," Nov. 2000, IEEE Signal Processing Magazine,vol. 17,Issue:6,Nov. 2000,pp. 12-32.*

Pedro Morgado, "Self-Supervised Generation of Spatial Audio for 360 Video," Dec. 2-8, 2018, 32nd Conference on Neural Information Processing Systems (NeurIPS 2018), Montréal, Canada.,pp. 1-9.*

Fang-Fei Kuo,"Background music recommendation for video based on multimodal latent semantic analysis," Sep. 26, 2013,2013 IEEE International Conference on Multimedia and Expo (ICME),pp. 2-5.*

Ting-Wei Lin,"Correlation-based Background Music Recommendation by Incorporating Temporal Sequence of Local Features," Jul. 3, 2017,2017 IEEE Third International Conference on Multimedia Big Data,pp. 158-162.*

Amirsina Torfi,"3D Convolutional Neural Networks for Cross Audio-Visual Matching Recognition," Oct. 9, 2017,IEEE Access ,vol. 5,2017,pp. 22081-22087.*

Anonymous, "Get Track's Audio Features," Spotify for Developers, retrieved via Internet: https://developer.spotify.com/documentation/web-api/reference/#/operations/get-audio-features, on Apr. 15, 2022, pp. 1-4.

Kuo, F.-F. et al., "Background music recommendation for video based on multimodal latent semantic analysis," 2013 IEEE International Conference on Multimedia and Expo (ICME), Jul. 2013, pp. 1-6.

Lin, J.-C. et al., "DEMV-matchmaker: Emotional temporal course representation and deep similarity matching for automatic music video generation," 2016 IEEE International Conference on Acoustics, Speech and Signal Processing (ICASSP). Mar. 2016, 2772-2776.

Lin, J.-C., "Automatic Music Video Generation Based on Simultaneous Soundtrack Recommendation and Video Editing," Proceedings of the 25th ACM international conference on Multimedia (MM '17). Association for Computing Machinery, Oct. 2017, pp. 519-527.

Lin, T. et al., "Correlation-Based Background Music Recommendation by Incorporating Temporal Sequence of Local Features," 2017 IEEE Third International Conference on Multimedia Big Data (BigMM), Apr. 2017, pp. 158-164.

Sasaki, S. et al., "Affective Music Recommendation System Based on the Mood of Input Video," MultiMedia Modeling, MMM 2015, Lecture Notes in Computer Science, vol. 8936, Jan. 2015, Abstract.

Shah, R. et al., "ADVISOR—Personalized Video Soundtrack Recommendation by Late Fusion with Heuristic Rankings," MM '14: Proceedings of the 22nd ACM international conference on Multimedia, Nov. 2014, pp. 607-616.

* cited by examiner

DEEP LEARNING SYSTEM FOR DETERMINING AUDIO RECOMMENDATIONS BASED ON VIDEO CONTENT

BACKGROUND

Video can be an effective medium for expressing ideas and concepts. In many cases, the background music of a video sequence can play a pivotal role on creating an engaging and effective video. Finding the appropriate audio sequences that complement the video sequence can be a difficult and/or time-consuming process. For example, a video of a wedding can contain a wide variety of moods, requiring a selection of several audio sequences to capture the variations in mood. A user can determine the theme, pacing, and mood variations within the video sequence, but then would have to attempt to locate the appropriate audio sequences in a vast library of audio tracks.

Existing solutions to address this include systems that perform emotion matching. Emotion matching works by detecting emotions in video and target audio, and then ranking audio tracks based on detected emotions in the video. To perform the ranking, these systems learn a deep similarity metric between temporal histograms of emotions in video and audio.

Other existing solutions attempt to find correlations between low-level handcrafted audio-visual features. In these solutions, the video features considered include color, light, texture, and motion, which are extracted from the first frame of each shot. The audio features considered include rhythm, timbre, and global features (e.g., danceability, duration, energy, key, loudness, mode, tempo, time signature, etc.) extracted from the video. Latent correlations are then discovered between these audio-visual features.

However, these existing solutions are limited in several ways. For example, emotion matching approaches suffer from the accuracy of emotion detection as people can display conflicting emotions, e.g., expressing sad emotions in a happy and/or romantic context of a wedding or expressing angry emotions in response to a humorous prank video. Further, emotion matching approaches only consider detectable emotions and cannot consider any other factors that could indicate an appropriate background track. One drawback of using low-level hand-crafted features is their lack of high-level semantic information that is crucial in many audio-visual analysis tasks. In addition, the above-noted approaches do not consider the actual objects, their interplay, and/or other dense high-level features that might be useful for this task.

These and other problems exist with regard to systems that provide audio recommendations.

SUMMARY

Introduced here are techniques/technologies that use machine learning to determine an audio sequence recommendation for a video sequence. For example, in some embodiments, an audio recommendation system receives a video sequence as an input. The audio recommendation systems analyzes the video sequence to determine frame level features and video level features of the video sequence. The frame level features and video level features of the video sequence are sent to an audio reasoning module that generates an audio vector for the video sequence. The audio reasoning module generated the audio vector for the video sequence by passing the frame level features and video level features through a plurality of convolutional neural networks. The audio recommendation system then determines the audio sequence recommendation for the video sequence by comparing the generated audio vector for the video sequence with stored audio vectors for a plurality of stored audio sequences.

Additionally, the audio reasoning module is trained using a loss function. This loss function is based on a comparison of an audio vector generated by the audio reasoning module based on an input video (e.g., an anchor audio embedding), a ground truth audio vector for the input video (e.g., a positive audio embedding), and a randomly selected audio vector from an audio catalog (e.g., a negative audio embedding). The loss function is a triplet loss function that enables the audio reasoning module to learn to decrease the Euclidean distance between anchor and positive audio embeddings and increase the Euclidean distance between anchor and negative audio embedding.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

One or more embodiments of the present disclosure include an audio recommendation system that uses machine learning to determine a highly relevant audio sequence recommendation as a background music track for a video sequence based on the content of the video sequence. The audio recommendation system trains and deploys an audio reasoning module to generate an audio vector for an input video sequence. The audio reasoning module generates the audio vector by passing frame level video features and video level video features through different convolutional neural networks. The audio recommendation system uses the generated audio vector to identify audio sequences that are similar to the generated audio vector for recommendation as a background audio track for the input video sequence.

Embodiments address the deficiencies of prior techniques that only analyze video for emotions or low-level audio-visual feature through a number of optimizations. For example, the audio recommendation system is a neural network architecture that can process spatial and temporal video features simultaneously and generate an audio vector (or audio embedding) based on them, which can then be used to retrieve matching background tracks based on closest Euclidean distance. The audio recommendation system further trains an audio reasoning module using backpropagation to minimize the Euclidean distance between actual (ground truth) audio vectors and generated audio vectors and maximize the distance between generated audio vectors and the audio vectors of unrelated (or randomly-selected) audio sequences via triplet loss.

Figure 1:
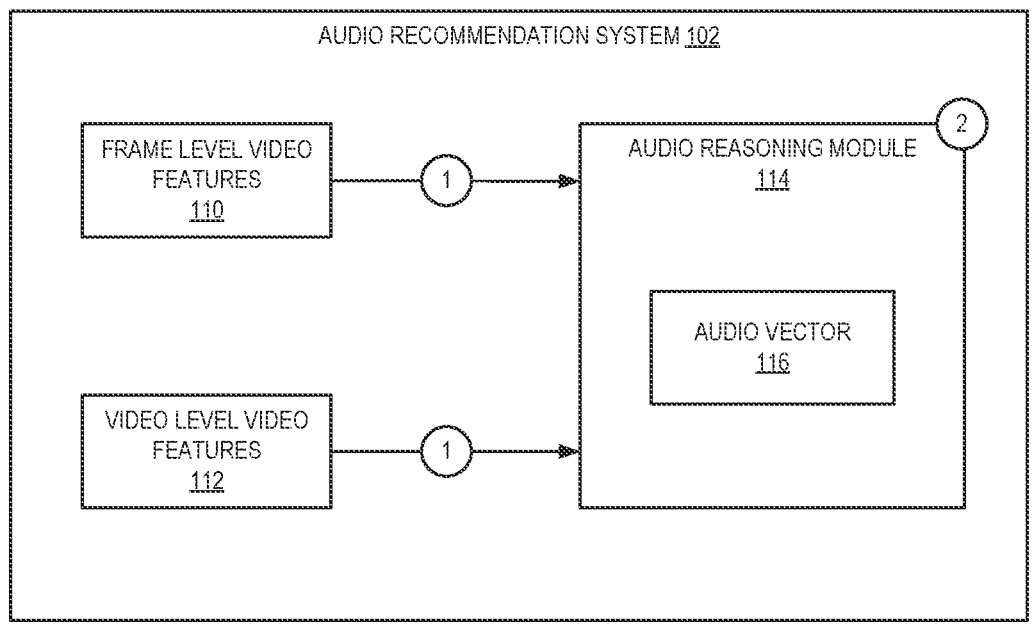
FIG. 1 illustrates a diagram of a process of generating an audio vector for a video input using an audio reasoning module in accordance with one or more embodiments.

FIG. 1 illustrates a diagram of a process of generating an audio vector for a video input using an audio reasoning module in accordance with one or more embodiments. As shown in FIG. 1, in one or more embodiments, an audio reasoning module 114 of an audio recommendation system 102 receives frame level video features 110 and video level video features 112 as inputs, as shown at numeral 1. In one or more embodiments, the frame level video features 110 are a plurality of 1024-dimensional frame level vectors, where each frame level vector is for a segment of a video sequence. For example, each frame level vector is a representation of one second of the video sequence. The video level video features 112 can include a single 1024-dimensional video level vector representing the entire video sequence. The video level vector can be generated by averaging the plurality of frame level video features 110 to obtain the one video level video feature.

In one or more embodiments, the audio reasoning module 114 generates an audio vector 116 using the frame level video features 110 and the video level video features 112, as shown at numeral 2. The audio reasoning module 114 is a neural network that includes deep learning architecture for learning representations of audio from video features. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data. The audio reasoning module 114 is a model trained to extract temporal and spatial features from the frame level video features 110 and the video level video features 112 and use the extracted features to generate the audio vector 116. In one or more embodiments, the generated audio vector 116 can be used to identify one or more audio sequences for recommendation as a background track for a video sequence used to generate the frame level video features 110 and the video level video features 112.

Figure 2:
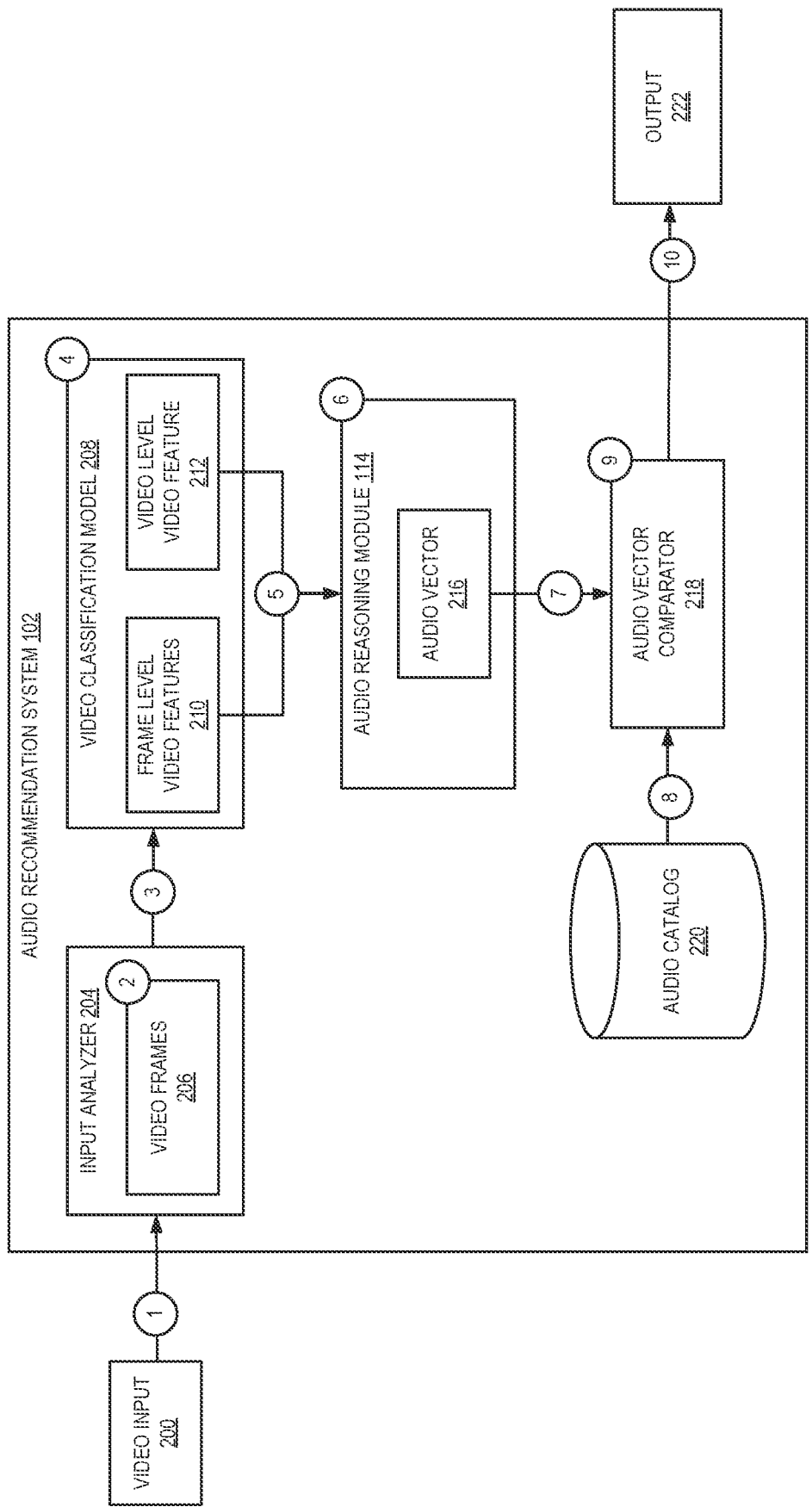
FIG. 2 illustrates a diagram of a process of determining audio recommendations for a video input using an audio recommendation system in accordance with one or more embodiments.

FIG. 2 illustrates a diagram of a process of determining audio recommendations for a video input using an audio recommendation system in accordance with one or more embodiments. As shown in FIG. 2, in one or more embodiments, an audio recommendation system 102 receives a video input 200, as shown at numeral 1. For example, the audio recommendation system 102 receives the video input 200 from a user via a computing device. In one or more embodiments, the video input 200 includes a video sequence. The video sequence can be a portion selected from a longer video sequence. In one example, a user may select a video file including the video sequence in an application and be presented with an interface to select the portion of the longer video sequence. In another example, a user may submit video input 200 to a web service, or an application configured to receive video files as inputs and provide audio recommendations as outputs.

In one or more embodiments, the audio recommendation system 102 includes an input analyzer 204 that receives the video input 200. In one or more embodiments, the input analyzer 204 analyzes the video input 200 to extract video frames 206, as shown at numeral 2. The input analyzer 204 can extract the video frames 206 at a specified sample rate. For example, the input analyzer 204 can extract frames from the video input 200 at a sample rate of one frame per second of video. As an example, for a five-minute video sequence, the input analyzer 204 extracts 300 video frames. After extracting the video frames 206, the input analyzer 204 can send the video frames 206 to a video classification model 208, as shown at numeral 3.

In one or more embodiments, the video classification model 208 is a convolutional neural network trained to classify images. In one or more embodiments, the video classification model 208 is an Inception network trained on ImageNet to extract video features from a video sequence. In one or more embodiments, the video classification model 208 receives the video frames 206 from the input analyzer 204 and processes the video frames 206 to generate frame level video features 210 and video level video feature 212, as shown at numeral 4. In one or more embodiments, each frame of the video frames 206 is passed through the video classification model 208 to obtain frame level video features. The result of passing the video frames 206 through video classification model 208 is a plurality of frame level video features, each with a dimensionality of 2048 per frame. In one or more embodiments, these frame level video features can be quantized to 8-bit and Principal Components Analysis (PCA) with whitening can then be applied to the frame level video features, resulting in the frame level video features 210, each with a dimensionality of 1024 per frame. The frame level video features 210 can also be referred to as 1024-dimensional frame level vectors. In one or more embodiments, the video classification model 208 averages the plurality of frame level video features 210 to generate a single video level video feature 212, with a dimensionality of 1024. The one video level video feature 212 can also be referred to as a 1024-dimensional video level vector.

In one or more embodiments, the video classification model 208 sends the frame level video features 210 and the video level video features 212 to an audio reasoning module 114, as shown at numeral 5. In other embodiments, the video classification model 208 can send the frame level video features 210 and the video level video features 212 to a memory or storage location.

In one or more embodiments, the audio reasoning module 114 processes the frame level video features 210 and the video level video features 212 to generate an audio vector 216, as shown at numeral 6. The audio reasoning module 114 is a neural network that includes deep learning architecture for learning representations of audio from video features of a video input (e.g., video input 200). The audio reasoning module 114 is a model trained to extract temporal and spatial features from the frame level video features 210 and the video level video features 212 and use the extracted features to generate the audio vector 216. The process of generation an audio vector is described with respect to FIG. 3.

Figure 3:
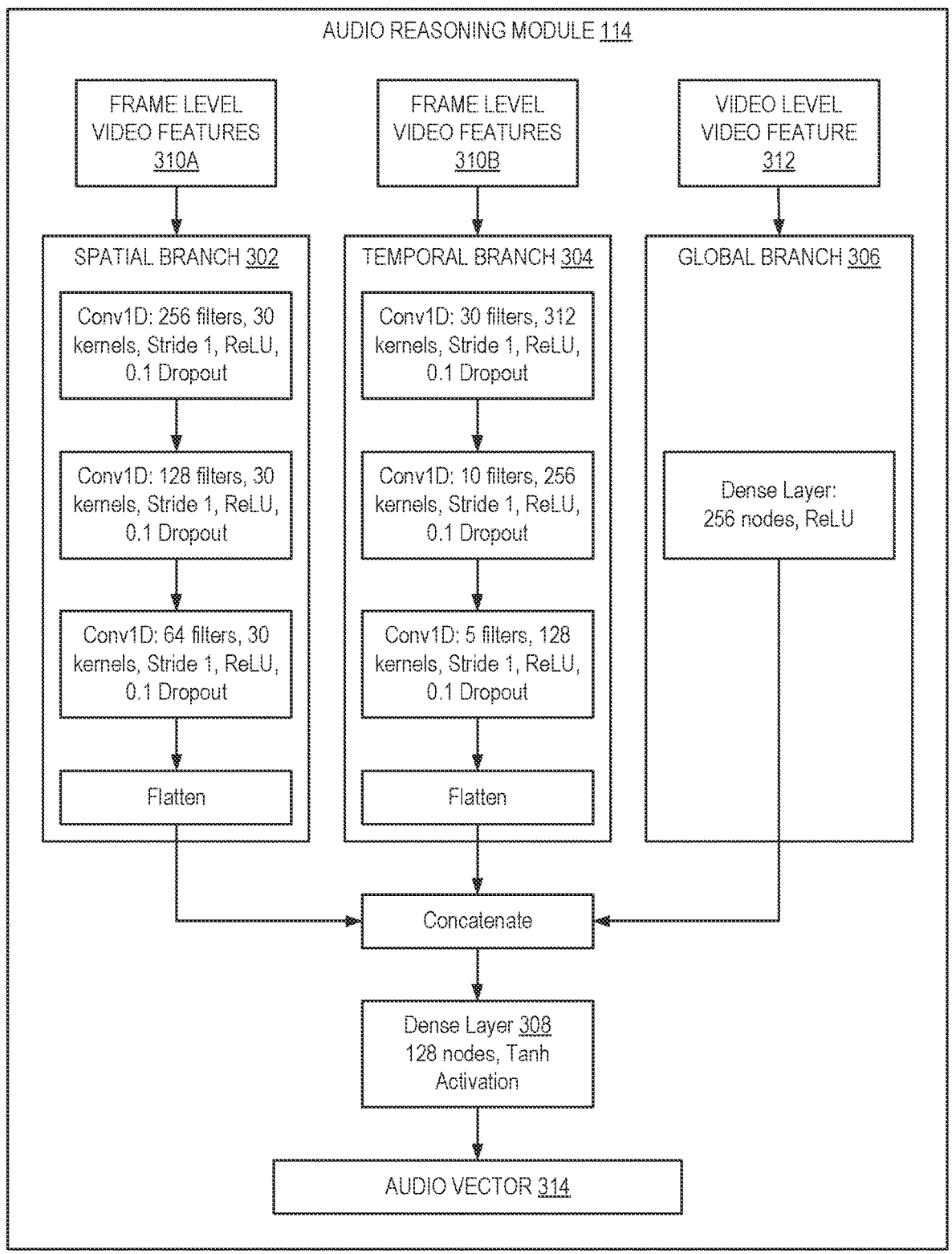
FIG. 3 illustrates an example audio reasoning module for generating audio vectors for video inputs in accordance with one or more embodiments.

FIG. 3 illustrates an example audio reasoning module 114 for generating audio vectors for video inputs in accordance with one or more embodiments. As illustrated in FIG. 3, the audio reasoning module can include three branches: a spatial branch 302, a temporal branch 304, and a global branch 306. Each of the spatial branch and the temporal branch is a three-layer deep convolutional neural network performing convolutions over a single dimensional. In one or more embodiments, the spatial branch 302 and the temporal branch 304 extracts spatial and temporal features, respectively, to capture the variance in mood, pacing, etc. of the video, and the global branch 306 works on features extracted from the full video and captures the overall theme of the video input 200.

In one or more embodiment, frame level video features 310A are provided to the spatial branch 302, frame level video features 310B are provided to the temporal branch 304, and video level video features 312 are provided to the global branch 306. In one or more embodiments, frame level video features 310B is the transposed matrices form of frame level video features 310A. For example, given a video input of 300 seconds in length, the frame level video features 310A are 300 1024-dimensional frame level video features (or frame level video vectors), and the frame level video features 310B are 1024 300-dimensional frame level video features.

In one or more embodiments, the spatial branch 302 convolves across all 1024 length frame vectors of the video and tries to learn features across frames. The temporal branch 304 convolves across 300 frames of the video and learns to capture temporal features. Each of the spatial branch 302 and the temporal branch 304 has three convolutional neural network layers, using Rectified Linear Unit (ReLU) activation followed by a flattening layer. In one or more embodiments, a dropout layer with a drop rate of 0.1 is added after each convolutional neural network layer for regularization. In one or more embodiments, the global branch 306 includes a dense layer through which the video level video feature 312 is passed. In one or more embodiments, the audio reasoning module 114 learns over 18 million features.

In one or more embodiments, the first layer of the spatial branch 302 extracts features from the video frames by identifying objects and actions. Subsequent layers of the spatial branch 302 attempt to learn higher-level features from the video frames. As an example, the first layer of the spatial branch 302 can extract video features within specified intervals of time (e.g., five frames or seconds) that it uses to identify objects (e.g., a tree, kids, etc.). The second layer of the spatial branch 302 can extract additional features that it uses to identify how objects are interacting and what actions are being performed (e.g., kids running in a park). The third layer of the spatial branch 302 can extract more additional features that it used to determine that the video is about kids playing in a park with their parents.

In one or more embodiments, the layers of the temporal branch 304 can extract video features within specified intervals of time (e.g., five frames or seconds) that it uses to identify how objects are changing or varying with time (e.g., mood changes, variations in tempo, etc.). For example, the temporal branch 304 can identify that the first five frames are fast-paced, while the next five frames are slower-paced, and so on. In one or more embodiments, the global branch 306 evaluates the average of all of frames to extract higher-level features of from the video as a whole.

The spatial features, temporal features, and global features generated by the three branches of the audio reasoning module 114 are then concatenated and passed through a dense layer 308, with audio vector 314 as the output of the dense layer 308. In one or more embodiments, the dense layer 308 is a neural network that determines an audio vector 314 (or audio embedding), from the concatenated information from the three branches, that best matches the features identified from the three branches 302-306.

Returning to FIG. 2, in one or more embodiments, the audio reasoning module 114 sends the generated audio vector 216 to an audio vector comparator 218, as shown at numeral 7. In other embodiments, the audio reasoning module 114 can send the generated audio vector 216 to a memory or storage location for subsequent retrieval by the audio vector comparator 218.

In one or more embodiments, the audio vector comparator 218 receives one or more stored audio vectors for audio sequences from an audio catalog data store 220, as shown at numeral 8.

In one or more embodiments, the audio vector comparator 218 determines an audio recommendation using the audio vector 216 and the one or more stored audio vectors for audio sequences from an audio catalog data store 220, as shown at numeral 9. The audio vector comparator 218 can compare the audio vector generated by the audio reasoning module 114 to each of the one or more stored audio vectors by calculating the Euclidean distances between each pair. The audio vector comparator 218 can rank or sort the one or more stored audio vectors by their distances to the audio vector generated by the audio reasoning module 114, where a smaller calculated Euclidean distance for a pair indicates the stored audio vector is closer to the generated audio vector and more likely to be an appropriate recommendation for the video input. Conversely, a larger calculated Euclidean distance for a pair indicates the stored audio vector is further away from the generated audio vector and less likely to be an appropriate recommendation for the video input.

In one or more embodiments, after the one or more stored audio vectors have been sorted or ranked, the audio vector comparator 218 can generate an output 222 indicating one or more stored audio sequences as audio recommendations for the video input, as shown at numeral 10. In one or more embodiments, the audio vector comparator 218 determines a recommended audio sequence as the output 222 when a stored audio vector for the recommended audio sequence is within a threshold distance from the audio vector generated by the audio reasoning module 114.

Figure 4:
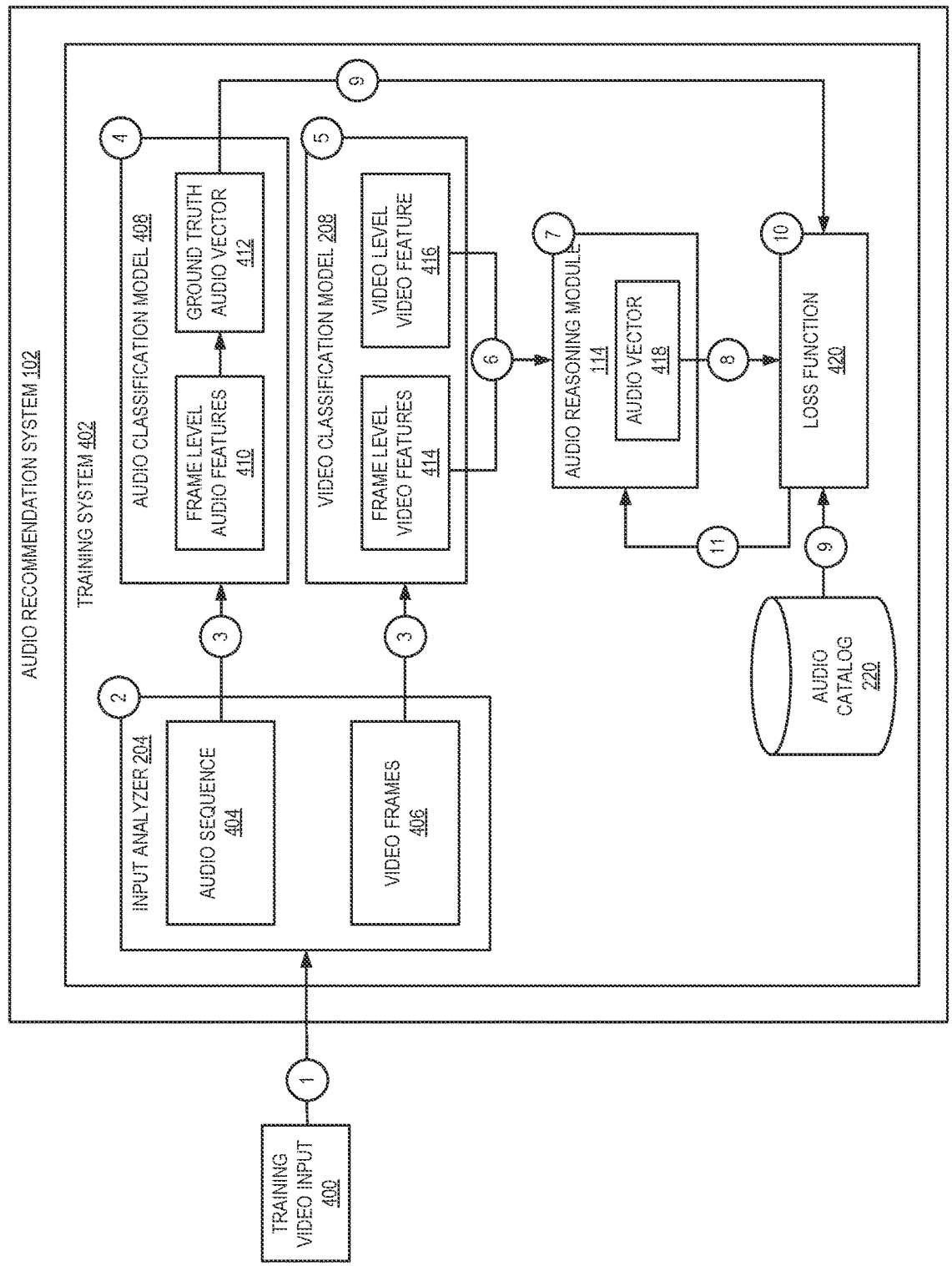
FIG. 4 illustrates a diagram of a training system for training a machine learning model to determine audio recommendations for a video input using a loss function in accordance with one or more embodiments.

FIG. 4 illustrates a diagram of a training system for training a machine learning model to determine audio recommendations for a video input using a loss function in accordance with one or more embodiments. Embodiments use a loss function 420 during training which forces the audio reasoning module 114 to learn to estimate an audio vector based on frame level video features 414 and a video level video feature 416.

As shown in FIG. 4, training proceeds similarly to the inference process described above with respect to FIG. 2. The training system 402 receives a training video input 400, as shown at numeral 1. For example, the audio recommendation system 102 receives the training video input 400 from a user via a computing device or from a memory or storage location. Although depicted as part of audio recommendation system 102, in various embodiments, training system 402 may be implemented as a separate system implemented on electronic devices separate from the electronic devices implementing audio recommendation system 102. In one or more embodiments, the training video input 400, or training video data, includes a video file including a video sequence with an embedded audio sequence. The training video input 400 can include multiple video files that can be fed to the audio recommendation system 102 in parallel or in series.

In one or more embodiments, the audio recommendation system 102 includes an input analyzer 204 that receives the training video input 400. In one or more embodiments, the input analyzer 204 analyzes the training video input 400 to extract audio sequence 404 and video frames 406, as shown at numeral 2. In one or more embodiments, the input analyzer 204 can extract the audio sequence 404 from the training video input 400 as a raw audio waveform or in any suitable audio format. The input analyzer 204 can extract the video frames 406 at a specified sample rate. For example, the input analyzer 204 can extract video frames 406 from the training video input 400 at a sample rate of one frame per second of video. After extracting the audio sequence 404 and the video frames 406 from the training video input 400, the input analyzer 204 can send the audio sequence 404 to an audio classification model 408 and send the video frames 406 to a video classification model 208, as shown at numeral 3. In other embodiments, the audio reasoning module 114 can send the audio sequence 404 and the video frames 406 to a memory or storage location for subsequent retrieval by the audio classification model 408 and the video classification model 208, respectively.

In one or more embodiments, the audio classification model 408 processes the audio sequence 404 to generate a ground truth audio vector 412, as shown at numeral 4. In one or more embodiments, the audio classification model 408 is a convolutional neural network trained to classify audio. In one or more embodiments, the video classification model 208 is a VGGish network that can extract audio features from an audio sequence to generate a semantically meaningful 128-dimensional audio vector (or audio embedding). In one or more embodiments, the audio classification model 408 receives the audio sequence 404 from the input analyzer 204 and processes the audio sequence 404 to generate frame level audio features 410. The result of passing the audio sequence 404 through audio classification model 408 is a plurality of frame level audio features 410 (or training frame level audio features), each with a dimensionality of 128 per second of audio. For example, given a training video input 400 that is 300 seconds in length, the audio classification model 408 will generate 300 128-dimensional frame level audio features 410. The frame level audio features 410 can also be referred to as 128-dimensional frame level audio vectors. In one or more embodiments, the audio classification model 408 averages the plurality of frame level audio features 410 to generate a single ground truth audio vector 412, with a dimensionality of 128. The ground truth audio vector 412 can also be referred to as a 128-dimensional audio vector.

In one or more embodiments, the video classification model 208 is a convolutional neural network trained to classify images. In one or more embodiments, the video classification model 208 is an Inception network trained on ImageNet. In one or more embodiments, the video classification model 208 receives the video frames 406 from the input analyzer 204 and processes the video frames 406 to generate frame level video features 414 (or training frame level video features) and a video level video feature 416 (or training video level video features), as shown at numeral 5. In one or more embodiments, the video classification model 208 generates the frame level video features 414 and the video level video feature 416 in the manner described with respect to FIG. 2.

In one or more embodiments, the video classification model 208 sends the frame level video features 414 and the video level video features 416 to an audio reasoning module 114, as shown at numeral 6. In other embodiments, the video classification model 208 can send the frame level video features 414 and the video level video features 416 to a memory or storage location.

In one or more embodiments, the audio reasoning module 114 processes the frame level video features 414 and the video level video features 416 to generate an audio vector 418, as shown at numeral 7. In one or more embodiments, the process of generating the audio vector 418 is similar to the process described with respect to FIGS. 2 and 3.

In one or more embodiments, the audio reasoning module 114 sends the generated audio vector 418 to a loss function 420, as shown at numeral 8. In one or more embodiments, the loss function 420 receives a randomly selected stored audio vector from an audio catalog data store 220 and the ground truth audio vector 412, as shown at numeral 9.

In one or more embodiments, the loss function 420 calculates the loss of the audio reasoning module, as shown at numeral 10. The loss function 420 can determine how close the audio vector (e.g., audio vector 418) generated by the audio reasoning module 114 was to the ground truth audio vector 412 generated from the actual audience sequence 404 extracted from the training video input 400.

In one or more embodiments, loss function 420 is a triplet loss function in which each training instance is a triplet. A triplet is a tuple of an anchor, a positive sample, and a negative sample, where the system learns to embed the anchor closer to the positive sample, and farther from negative sample. For example, the loss function 420 compares audio vector 418 generated by the audio reasoning module 114 (e.g., a positive sample) with a ground truth audio vector 412 (e.g., an anchor) and a randomly selected audio vector from the audio catalog 220 (e.g., a negative sample). The training system 402 uses the triplet loss generated by the loss function 420 to minimize the distance between the ground truth audio vector 412 and the generated audio vector 418 and increase the distance between the generated audio vector 418 and the randomly selected catalog audio vector from the audio catalog 220.

In one or more embodiments, the training system 402 trains the audio reasoning module 114 through backpropagation to the audio reasoning module 114, as shown at numeral 11.

Figure 5:
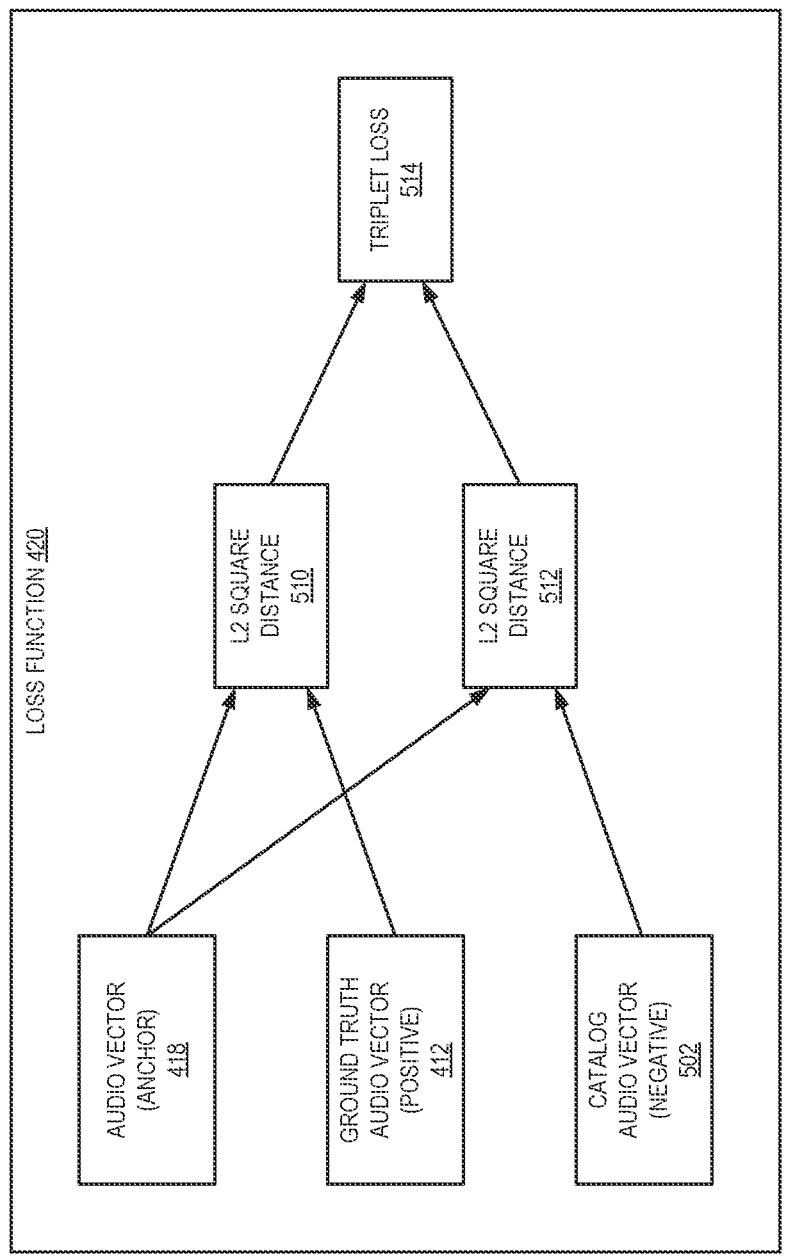
FIG. 5 illustrates a diagram of a process of determining a loss of an audio reasoning module in accordance with one or more embodiments.

FIG. 5 illustrates a diagram of a process of determining a loss of an audio reasoning module in accordance with one or more embodiments. Using the example of FIG. 4, loss function 420 includes the generated audio vector 418 (e.g., generated by the audio reasoning module 114) as the anchor sample, the ground truth audio vector 412 (e.g., generated by the audio classification model 408) as the positive sample, and a catalog audio vector 502 (e.g., randomly selected from the audio catalog) as the negative sample. The loss function 420 determines the L2 square distance 510, or Euclidean distance, between the generated audio vector 418 and the ground truth audio vector, and the L2 square distance 512 between the generated audio vector 418 and a randomly-selected catalog audio vector 502, and determines the triplet loss 514.

The triplet loss can be defined using the following Euclidean distance function:

$$\mathcal{L}(A,P,N)=\max(\|f(A)-f(P)\|^2-\|f(A)-f(N)\|^2+\alpha, 0),$$

where A is the training video input 400 (e.g., the anchor input), f(A) is the generated audio vector 418, P is a positive input of the same class as A, f(P) is the ground truth audio vector 412, N is a negative input of a different class from A (e.g., a randomly selected input from audio catalog 220), f(N) is the audio vector for the randomly selected catalog audio vector 502 from audio catalog 220, and $\alpha$ is a margin between positive and negative pairs. In one or more embodiments, $\alpha$ is set to the default value of "1."

In one or more embodiments, the loss determined by the loss function 420 is backpropagated to the audio reasoning module 114, as shown at numeral 10. In one or more embodiments, the loss is averaged over mini batches before being backpropagated to the audio reasoning module 114.

Figure 6:
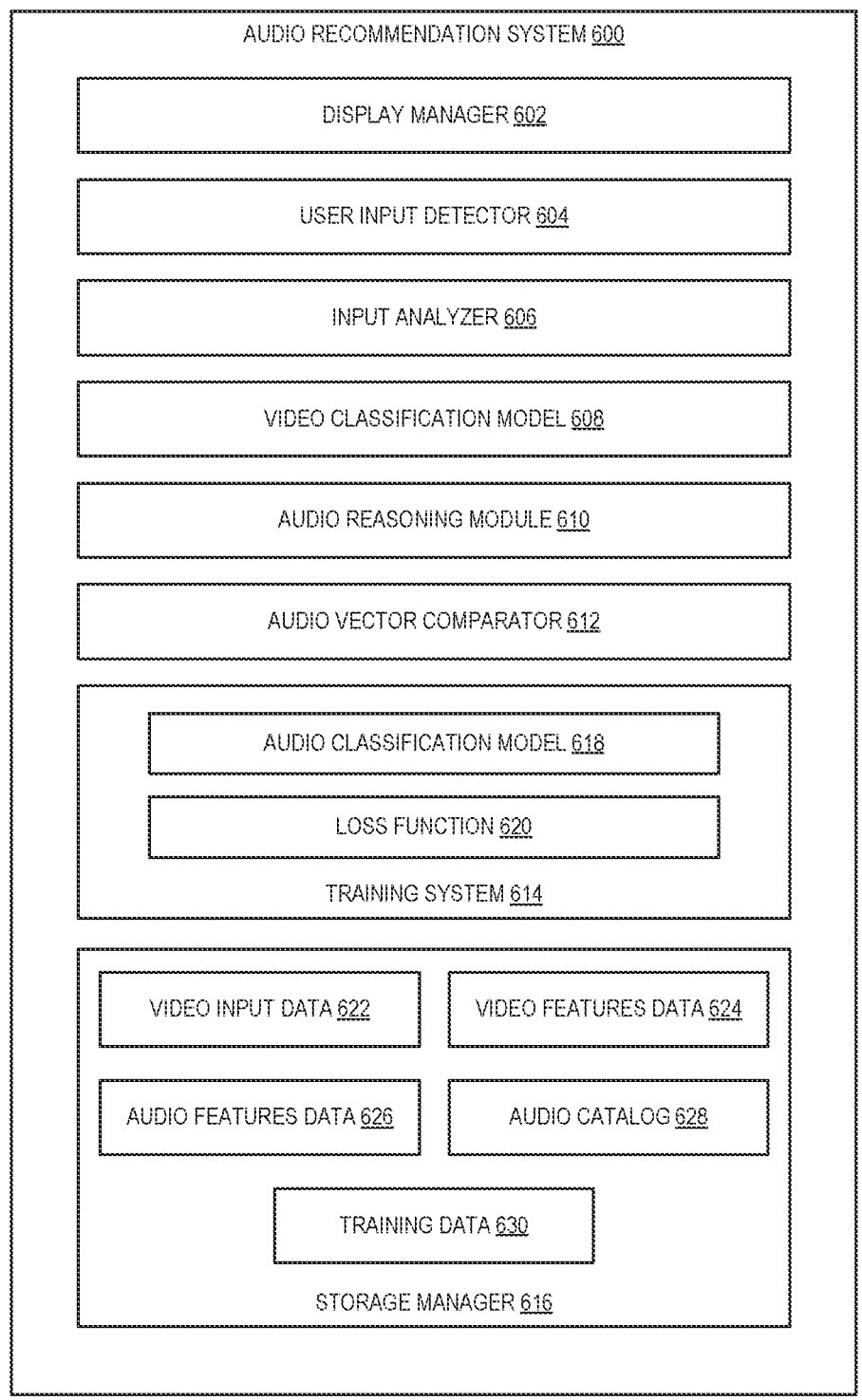
FIG. 6 illustrates a schematic diagram of audio recommendation system in accordance with one or more embodiments.

FIG. 6 illustrates a schematic diagram of an audio recommendation system (e.g., "audio recommendation system" described above) in accordance with one or more embodiments. As shown, the audio recommendation system 600 may include, but is not limited to, a display manager 602, a user input detector 604, an input analyzer 606, a video classification model 608, an audio reasoning module 610, an audio vector comparator 612, a training system 614 (e.g., training system 402 described above), and a storage manager 616. The training system 610 includes an audio classification model 618 and a loss function 620. The storage manager 616 includes video input data 622, video features data 624, audio features data 626, and audio catalog data 628.

As illustrated in FIG. 6, the audio recommendation system 600 includes a display manager 602. In one or more embodiments, the display manager 602 identifies, provides, manages, and/or controls a user interface provided on a computing device. Examples of displays include interactive whiteboards, graphical user interfaces (or simply "user interfaces") that allow a user to view and interact with content items, or other items capable of display on a display screen. For example, the display manager 602 may identify, display, update, or otherwise provide various user interfaces that include one or more display elements in various layouts. In one or more embodiments, the display manager 602 can identify a display provided on a touch screen. For example, a display provided on a touch screen may include a graphical user interface including one or more display elements capable of being interacted with via one or more touch gestures or other types of user inputs (e.g., using a stylus, a mouse, or other input devices). In one or more other embodiments, the display manager 602 can identify other types of displays (e.g., including monitors, projectors, headsets, etc.) that may be interacted with using a variety of input devices.

More specifically, the display manager 602 can identify a variety of display elements within a graphical user interface as well as the layout of the graphical user interface. For example, the display manager 602 may identify a graphical user interface including one or more display elements. Display elements include, but are not limited to buttons, text boxes, menus, thumbnails, scroll bars, hyperlinks, etc. In one or more embodiments, the display manager 602 can identify a graphical user interface layout as well as the display elements displayed therein. For example, the display manager 602 can identify and display a graphical user interface layout that includes interface elements that allow a user to select an input (e.g., a video input or a training video input) and submit the selected input to the audio recommendation system 600.

As further illustrated in FIG. 6, the audio recommendation system 600 also includes a user input detector 604. In one or more embodiments, the user input detector 604 detects, receives, and/or facilitates user inputs in any suitable manner. In some examples, the user input detector 604 detects one or more user interactions. As referred to herein, a "user interaction" means a single input, or combination of inputs, received from a user by way of one or more input devices, or via one or more touch gestures. In some examples, the user input detector 604 can detect user interactions in relation to and/or directed at one or more display elements displayed as part of a display. In one or more embodiments, the user inputs can include those performed by a user to send inputs to the audio recommendation system 600.

The user input detector 604 may additionally, or alternatively, receive data representative of a user interaction. For example, the user input detector 604 may receive one or more user configurable parameters from a user, one or more commands from the user, and/or any other suitable user input. For example, the user can perform a user interaction that includes the selection of video input or indication of a location of a video input for provision to the audio recommendation system 600.

As further illustrated in FIG. 6, the audio recommendation system 600 also includes an input analyzer 606. The input analyzer 606 can be configured to receive the video input and analyze the video input to generate video frames. In one embodiment, the input analyzer 606 can extract video frames from the video input at a specified sample rate. For example, the input analyzer 606 can extract video at a sample rate of one frame per second. During a training phase of the audio recommendation system 600, a training video input also includes an embedded audio sequence. In one or more embodiments, when the input analyzer 606 receives the training video input, the audio sequence can be extracted from the training video input.

As further illustrated in FIG. 6, the audio recommendation system 600 also includes a video classification model 608. In one or more embodiments, the video classification model 608 is an Inception-Net CNN. In one or more embodiments, the video classification model 608 is configured to generate frame level video features and video level video features using the video frames extracted from the video input. For example, for a video input with 300 video frames, the video classification model 608 generates 300 frame level video features of 2048 dimension, which are then quantized to 8-bit. PCA with whitening can then be applied to the 300 frame level video features to reduce the dimensionality to 1024 per frame. The 300 frame level video features can also be referred to as 300 1024-dimensional frame level vectors. The video classification model 608 then generates the video level video features by averaging the 300 frame level video features to obtain one 1024-dimensional video level video feature. The one video level video feature can also be referred to as a 1024-dimensional video level vector.

As illustrated in FIG. 6, the audio recommendation system 600 includes an audio reasoning module 610. In one or more embodiments, the audio reasoning module 610 can be any deep learning architecture for learning representations of audio from video sequences. The audio reasoning module 610 can receive or retrieve feature vectors representing frame level video features and video level video features of a video input. The feature vectors can be received or retrieved from the video classification model 608, an external source, or a storage location (e.g., storage manager 616). The audio reasoning module 610 can process the feature vectors through a spatial branch, a temporal branch, and a global branch, where each branch is a convolutional neural network to generate different types of features of the video input. The features generated by the three branches (e.g., the spatial branch, the temporal branch, and the global branch) can then be concatenated and passed through a dense layer to generate an audio vector.

As further illustrated in FIG. 6, the audio recommendation system 600 also includes an audio vector comparator 612. The audio vector comparator 612 can be configured to determine an audio recommendation for use as a background track for the video input. In one or more embodiments, the audio vector comparator 612 receives the audio vector generated by the audio reasoning module 114 and one or more stored audio vectors for audio sequences from an audio catalog data store. The audio vector comparator 612 can compare the audio vector generated by the audio reasoning module 114 to each of the one or more stored audio vectors by calculating the Euclidean distances between each pair. The audio vector comparator 612 can rank or sort the one or more stored audio vectors by their distances to the audio vector generated by the audio reasoning module 114, where a smaller calculated Euclidean distance for a pair indicates the stored audio vector is closer to the generated audio vector and more likely to be an appropriate recommendation for the video input. Conversely, a larger calculated Euclidean distance for a pair indicates the stored audio vector is further away from the generated audio vector and less likely to be an appropriate recommendation for the video input. After the one or more stored audio vectors have been sorted or ranked, the audio vector comparator 612 can generate an output indicating one or more stored audio vectors as audio recommendations for the video input. In one or more embodiments, the audio vector comparator 612 can output a recommendation indicating an audio sequence when a stored audio vector for the audio sequence is within a threshold distance from the audio vector generated by the audio reasoning module 114.

As further illustrated in FIG. 6, the audio recommendation system 600 includes training system 614 which is configured to teach, guide, tune, and/or train one or more neural networks. In particular, the training system 614 trains a neural network, such as audio reasoning module 610, based on training data. In one or more embodiments, the training data includes video input has been video with embedded audio sequences. In one or more embodiments, the training data can include videos from specific categories (e.g., advertisements, movie clips, movie trailers) that have carefully selected background music, which helps the audio recommendation system 600 learn the correlation between video theme and relevant music. As described above, the video classification model 608 generates frame level video features and video level video feature from the training video input.

In addition, the training system 614 includes an audio classification model 618 to generate an audio vector for the embedded audio sequence of the training data. In one or more embodiments, the audio classification model 618 is VGGish CNN. In one or more embodiments, the audio classification model 618 is configured to generate frame level audio features using an audio sequence extracted from the training video input. In one or more embodiments, the audio classification model 618 receives the audio sequence as a raw audio waveform. The audio classification model 618 then converts the audio sequence into a semantically meaningful 128-dimensional embedding. For example, using a training video input with 300 audio frames, the audio classification model 618 generates 300 frame level audio features of 128 dimensions. The 300 frame level audio features can also be referred to as 300 128-dimensional frame level audio vectors. The audio classification model 618 computes an overall audio feature for the audio sequence by averaging the 300 audio vectors, resulting in a single 128-dimensional audio vector. The single 128-dimensional audio vector can also be referred to as a ground truth audio vector.

As described above, the frame level video features and video level video feature are provided to the audio reasoning module 610 to generate an audio vector. More specifically, the training system 614 is configured to access, identify, generate, create, and/or determine training input and utilize the training input to train and fine-tune a neural network. For instance, the training system 614 trains the audio reasoning module 610 to learn to automatically recommend highly relevant background audio sequences based on the video content of a video input using a loss function 620. In one or more embodiments, loss function 620 is a triplet loss function in which each training instance is a triplet. A triplet is a tuple of an anchor, a positive sample, and a negative sample, where the system learns to embed the anchor closer to the positive sample, and farther from negative sample. For example, the loss function 620 compares an audio vector generated by the audio reasoning module 610 (e.g., a positive sample) with a ground truth audio vector (e.g., an anchor) and a randomly selected audio vector (e.g., a negative sample). Training system 614 trains the audio reasoning module 610 to minimize the distance between the ground truth audio vector and the generated audio vector and increase the distance between the ground truth audio vector and the randomly selected audio vector. In one or more embodiments, the loss is averaged over mini batches and backpropagated to the audio reasoning module 610.

The training system 614 includes an audio classification model 618. In one or more embodiments, the audio classification model 618 is VGGish CNN. In one or more embodiments, the audio classification model 618 is configured to generate frame level audio features using an audio sequence extracted from the training video input. In one or more embodiments, the audio classification model 618 receives the audio sequence as a raw audio waveform. The audio classification model 618 then converts the audio sequence into a semantically meaningful 128-dimensional embedding. For example, using a training video input with 300 audio frames, the audio classification model 618 generates 300 frame level audio features of 128 dimensions. The 300 frame level audio features can also be referred to as 300 128-dimensional frame level audio vectors. The audio classification model 618 computes an overall audio feature for the audio sequence by averaging the 300 audio vectors, resulting in a single 128-dimensional audio vector.

As illustrated in FIG. 6, the audio recommendation system 600 also includes the storage manager 616. The storage manager 616 maintains data for the audio recommendation system 600. The storage manager 616 can maintain data of any type, size, or kind as necessary to perform the functions of the audio recommendation system 600. The storage manager 616, as shown in FIG. 6, includes video input data 622, video features data 624, audio features data 626, audio catalog 628, and training data 630. The video input data 622 can include video sequences that are to be analyzed by the audio recommendation system 600 to generate an audio sequence recommendation. For example, the video input and/or video frames generated from the video input can be temporarily stored in video input data 622 in the storage manager 616 until retrieved or sent to video classification model 608 for processing. The video features data 624 can include feature vectors (e.g., frame level video feature and video level video features) generated by the video classification model 608. The audio features data 626 can include the audio vectors generated by the audio reasoning module 610 and/or ground truth audio vectors generated by the audio classification model 608. The audio catalog 628 can include audio sequences that can be selected as recommendations as background tracks for video input to the audio recommendation system 600. The audio catalog 628 can also include pre-processed audio vectors for the audio sequences that can be used by the audio vector comparator 612 for comparing to audio vectors generated by the audio reasoning module 610. The training data 630 can include video sequences with embedded audio sequences that can be used by the training system 614 for training the audio reasoning module 610.

Embodiments were evaluated using a ranking metric and compared to existing approaches: Sliding Window Discretization and Cross-Model Factor Analysis. The ranking-based accuracy was calculating using the formula below:

$$\text{Accuracy} = 1 - \frac{\text{rank}(g) - 1}{|C| + 1}$$

where rank(g) is the rank of the ground truth and |C| is the total number of test samples.

Previous approach evaluated their model on 723 videos, while the approach described herein was evaluated on 6910 video across various categories. The evaluation of the embodiments described herein is shown in Table 1, below.

TABLE 1

Experimental Performance Comparison

| Approach | Test Data | Ranking Accuracy | Hit@10 |
|---|---|---|---|
| Sliding Window Discretization | 723 Videos | 82% | N/A |
| Cross-Modal Factor Analysis | 723 Videos | 93% | N/A |
| Audio Recommendation System | 6910 Videos | 97.8% | 94.68% |

According to ranking accuracy, the audio recommendation system outperforms the existing systems. The audio recommendation system further produced a 94.68% Hit@10 accuracy, which indicates that the audio recommendation system is able to identify and rank the correct audio sequence (e.g., the audio sequence embedded in the training video sequence) within top ten highest ranked audio sequences.

The quality of the generated audio vectors were also evaluated. As shown in Table 2, below, the fully trained audio recommendation system generates audio vectors that are 81% similar to the ground truth audio vectors, indicating that the audio recommendation system has learned to successfully map videos in an audio embedding space. Typically, cosine proximity is a vector similarity score ranging from −1 to 1. In Table 2, cosine proximity has been rescaled to a [0,1] interval.

TABLE 2

Experimental Performance Comparison

| Data | Cosine Proximity | Percentage Similarity |
|---|---|---|
| Training Data (48412 Videos) | 0.6502 | 82.52 |
| Validation Data (13832 Videos) | 0.6304 | 81.52 |
| Test Data (6916 Videos) | 0.6278 | 81.39 |

Each of the components 602-616 of the audio recommendation system 600 and their corresponding elements (as shown in FIG. 6) may be in communication with one another using any suitable communication technologies. It will be recognized that although components 602-616 and their corresponding elements are shown to be separate in FIG. 6, any of components 602-616 and their corresponding elements may be combined into fewer components, such as into a single facility or module, divided into more components, or configured into different components as may serve a particular embodiment.

The components 602-616 and their corresponding elements can comprise software, hardware, or both. For example, the components 602-616 and their corresponding elements can comprise one or more instructions stored on a computer-readable storage medium and executable by processors of one or more computing devices. When executed by the one or more processors, the computer-executable instructions of the audio recommendation system 600 can cause a client device and/or a server device to perform the methods described herein. Alternatively, the components 602-616 and their corresponding elements can comprise hardware, such as a special purpose processing device to perform a certain function or group of functions. Additionally, the components 602-616 and their corresponding elements can comprise a combination of computer-executable instructions and hardware.

Furthermore, the components 602-616 of the audio recommendation system 600 may, for example, be implemented as one or more stand-alone applications, as one or more modules of an application, as one or more plug-ins, as one or more library functions or functions that may be called by other applications, and/or as a cloud-computing model. Thus, the components 602-616 of the audio recommendation system 600 may be implemented as a stand-alone application, such as a desktop or mobile application. Furthermore, the components 602-616 of the audio recommendation system 600 may be implemented as one or more web-based applications hosted on a remote server. Alternatively, or additionally, the components of the audio recommendation system 600 may be implemented in a suit of mobile device applications or "apps." To illustrate, the components of the audio recommendation system 600 may be implemented in an audio editing application, including but not limited to ADOBE® Premiere Pro, ADOBE® Rush, and ADOBE® Spark. "ADOBE®" is either a registered trademark or trademark of Adobe Inc. in the United States and/or other countries.

Figure 7:
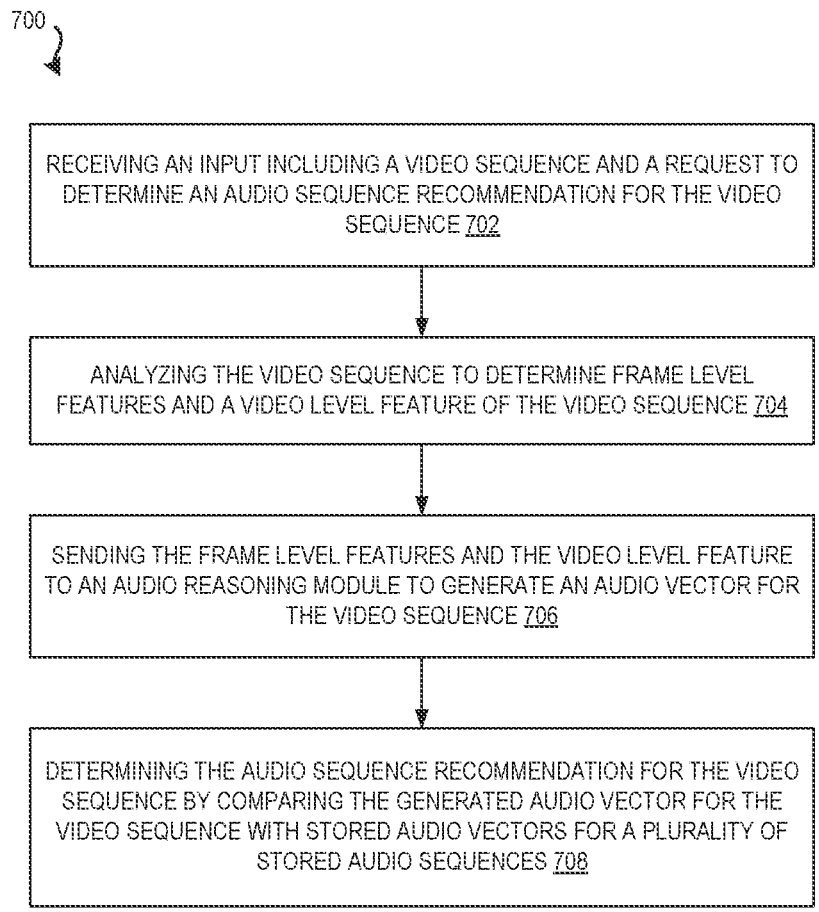
FIG. 7 illustrates a flowchart of a series of acts in a method of determining an audio sequence recommendation for a video input in accordance with one or more embodiments.
Figure 8:
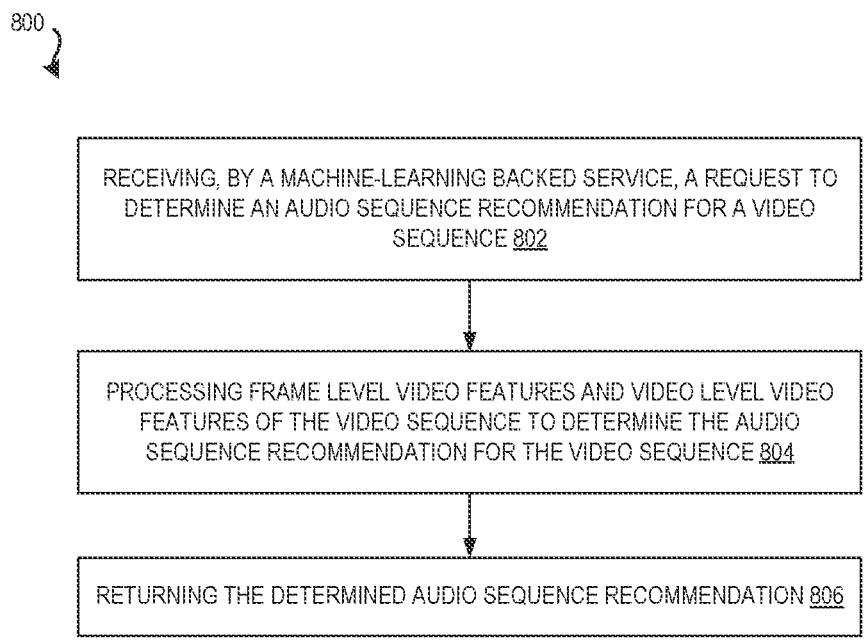
FIG. 8 illustrates a flowchart of a series of acts in a method of determining an audio sequence recommendation for a video input in accordance with one or more embodiments.

FIGS. 1-6, the corresponding text, and the examples, provide a number of different systems and devices that allows an audio recommendation system to determine an audio sequence recommendation for a video sequence by processing the video sequence through an audio reasoning module. In addition to the foregoing, embodiments can also be described in terms of flowcharts comprising acts and steps in a method for accomplishing a particular result. For example, FIGS. 7-8 illustrate flowcharts of exemplary methods in accordance with one or more embodiments. The methods described in relation to FIGS. 7-8 may be performed with less or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of a series of acts in a method 700 of determining an audio sequence recommendation for a video input in accordance with one or more embodiments. In one or more embodiments, the method 700 is performed in a digital medium environment that includes the audio recommendation system 600. The method 700 is intended to be illustrative of one or more methods in accordance with the present disclosure and is not intended to limit potential embodiments. Alternative embodiments can include additional, fewer, or different steps than those articulated in FIG. 7.

As shown in FIG. 7, the method 700 includes an act 702 of receiving, by an audio recommendation system, an input including a video sequence and a request to determine an audio sequence recommendation for the video sequence. In some embodiments, the machine-learning backed service may be a web service, or other application, configured to receive requests over one or more networks (e.g., the Internet). For example, a machine-learning backed service may be a web service or other application that uses machine learning techniques to perform one or more requested actions. In some embodiments, the video sequence and/or the request may be received from an application executing on a client computing device, such as a video editing application, web browser, or other application.

As shown in FIG. 7, the method 700 also includes an act 704 of analyzing, by a video classification model, the video sequence to determine frame level video features and video level video features of the video sequence. In one or more embodiments, the video classification model receives video frames of the video sequence. Each frame of the video sequence can then be passed through the video classification model to obtain frame level video features. The result of passing the video frames through video classification model is a plurality of frame level video features, each with a dimensionality of 2048 per frame. In one or more embodiments, these frame level video features can be quantized to 8-bit and PCA with whitening can then be applied to the frame level video features, resulting in the frame level video features, each with a dimensionality of 1024 per frame. In one or more embodiments, the video classification model averages the plurality of frame level video features to generate a single video level video feature, with a dimensionality of 1024.

As shown in FIG. 7, the method 700 also includes an act 706 of sending, by the video classification model, the frame level video features and the video level video feature to an audio reasoning module to generate an audio vector for the video sequence. In one or more embodiments, the audio reasoning module passes the frame level video features and the video level video feature generated by the video classification model through multiple branches to generate the audio vector. Each branch can be a convolutional neural network configured to process the frame level video features and the video level video feature. In one or embodiments, the audio reasoning module processes the frame level video features through a first neural network to generate spatial features of the video sequence, processes an inverted or transposed matrices form of the frame level video features through a second neural network to generate temporal features of the video sequence, and process the video level features through a third neural network to generate global features of the video sequence.

As shown in FIG. 7, the method 700 also includes an act 708 of determining, by the audio recommendation system, the audio sequence recommendation for the video sequence by comparing the generated audio vector for the video sequence with stored audio vectors for a plurality of stored audio sequences. In one or more embodiments, an audio vector comparator receives the audio vector generated by the audio reasoning module and one or more stored audio vectors for audio sequences from an audio catalog data store. The audio vector comparator can compare the audio vector generated by the audio reasoning module to each of the one or more stored audio vectors by calculating the Euclidean distances between each pair, where the smaller the distance, the more likely the store audio vector is similar to the generated audio vector and thus more likely to be an appropriate recommendation for the video input. Conversely, a larger calculated Euclidean distance for a pair indicates the stored audio vector is further away from the generated audio vector and less likely to be an appropriate recommendation for the video input. The audio vector comparator can generate a ranking of audio sequences based on their Euclidean distances between their corresponding stored audio vectors and the generated audio vector. In one or more embodiments, the ranking is a subset of one or more stored audio vector, e.g., the highest ranking stored audio vectors, stored audio vectors within a threshold Euclidean distance of the generated audio vector, etc.

In one or more embodiments, the machine-learning backed service sends the audio sequence recommendation to a client computing device which originated the request or to another computing device. In one or more embodiments, the machine-learning backed service stores the audio sequence recommendation in a memory or storage location. The audio sequence recommendation can include the ranking of the one or more stored audio sequences from the audio catalog. In one or more embodiments, the audio recommendation system selects the stored audio sequence from the audio catalog with the smallest Euclidean distance (e.g., the highest ranking store audio sequence) from the generated audio vector for the video sequence as the audio sequence recommendation for the vide sequence.

In some embodiments, the audio reasoning module is trained using a training system configured to obtain training data, the training data including at least one training video file with an embedded training audio sequence, analyze training video frames from the training video sequence to determine training frame level features and training video level features of the training video sequence, analyze training audio frames from the training audio sequence to determine a ground truth audio vector for the training audio sequence, send the training frame level features and the training video level features to the audio reasoning module to generate a training audio vector for the training video sequence, calculate, using a loss function, a loss of the training audio vector and the ground truth audio vector, and train the audio reasoning module based on the loss.

In some embodiments, calculating the loss of the training audio vector and the ground truth audio vector includes calculating a triplet loss using the training audio vector, the ground truth audio vector, and a randomly selected catalog audio vector from an audio catalog database.

In one or more embodiments, after receiving the audio sequence recommendation from the audio recommendation system, a user can provide inputs to modify the input video sequence by embedding one of the audio sequence recommendations as the background music for the input video sequence.

FIG. 8 illustrates a flowchart of a series of acts in a method 800 of determining an audio sequence recommendation for a video input in accordance with one or more embodiments. In one or more embodiments, the method 800 is performed in a digital medium environment that includes the audio recommendation system 600. The method 800 is intended to be illustrative of one or more methods in accordance with the present disclosure and is not intended to limit potential embodiments. Alternative embodiments can include additional, fewer, or different steps than those articulated in FIG. 8.

As shown in FIG. 8, the method 800 includes an act 802 of receiving, by a machine-learning backed service, a request to determine an audio sequence recommendation for a video sequence. In some embodiments, the machine-learning backed service may be a web service, or other application, configured to receive requests over one or more networks (e.g., the Internet). For example, a machine-learning backed service may be a web service or other application that uses machine learning techniques to perform one or more requested actions. In some embodiments, the video sequence and/or the request may be received from an application executing on a client computing device, such as a video editing application, web browser, or other application.

As shown in FIG. 8, the method 800 also includes an act 804 of processing, by the machine-learning back service, frame level video features and video level video features of the video sequence to determine the audio sequence recommendation for the video sequence. The machine learning-backed service may use one or more machine learning techniques to process the frame level video features and video level video features. For example, processing the frame level video features and video level video features may include receiving an input including the video sequence.

In some embodiments, the method may further include an act of analyzing the video sequence to determine the frame level video features and video level video features of the video sequence. In some embodiments, the method may further include an act of sending the frame level video features and the video level video features to an audio reasoning module to generate an audio vector for the video sequence, and determining the audio sequence recommendation for the video sequence by comparing the generated audio vector for the video sequence with stored audio vectors for a plurality of stored audio sequences.

As shown in FIG. 8, the method 800 also includes an act 806 of returning, by the machine-learning back service, the determined audio sequence recommendation. In one or more embodiments, the machine-learning backed served sends the response to the request to a client computing device which originated the request, to be displayed on the client computing device or other computing device.

Figure 9:
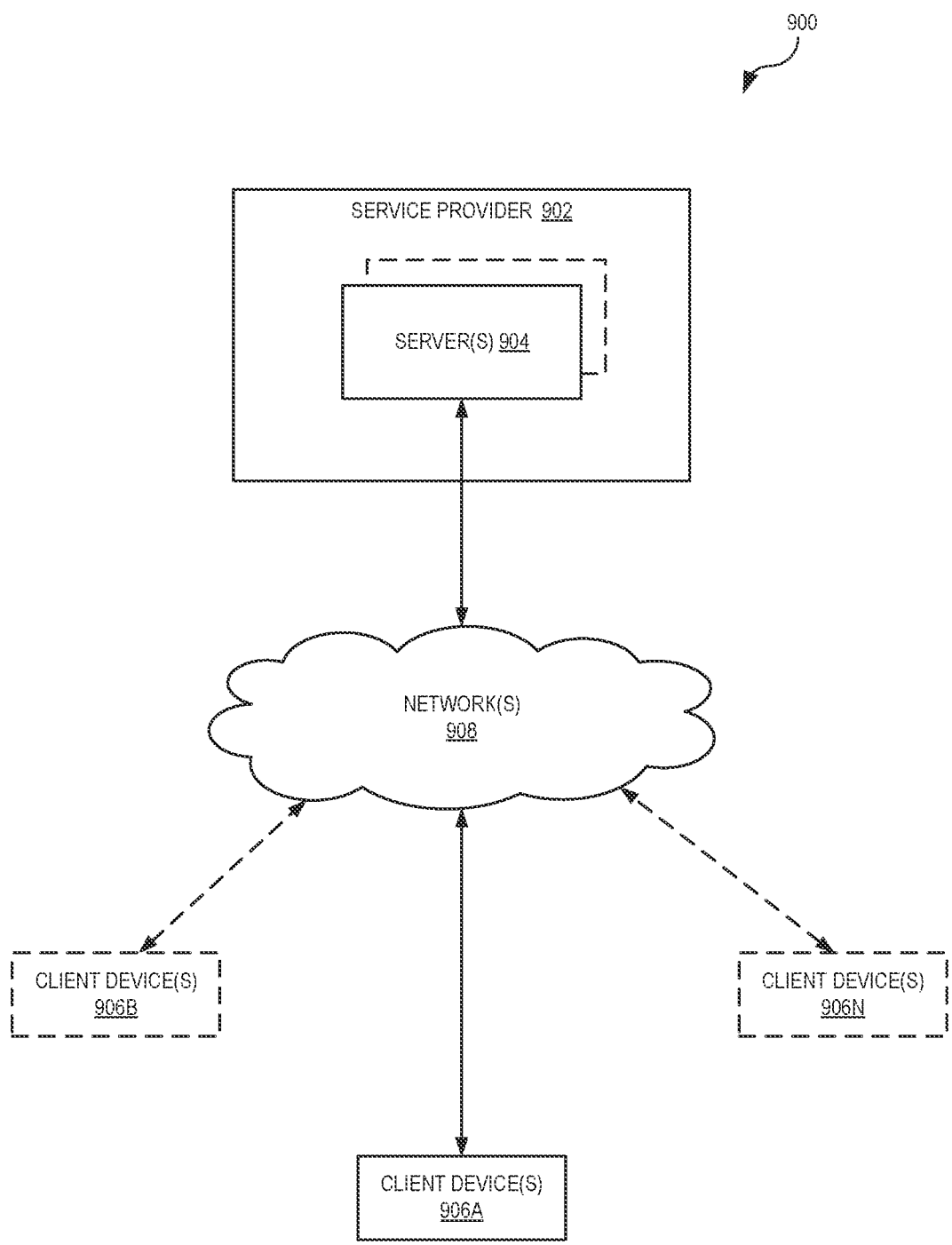
FIG. 9 illustrates a schematic diagram of an exemplary environment in which the audio recommendation system can operate in accordance with one or more embodiments.

FIG. 9 illustrates a schematic diagram of an exemplary environment 900 in which the audio recommendation system 600 can operate in accordance with one or more embodiments. In one or more embodiments, the environment 900 includes a service provider 902 which may include one or more servers 904 connected to a plurality of client devices 906A-806N via one or more networks 908. The client devices 906A-806N, the one or more networks 908, the service provider 902, and the one or more servers 904 may communicate with each other or other components using any communication platforms and technologies suitable for transporting data and/or communication signals, including any known communication technologies, devices, media, and protocols supportive of remote data communications, examples of which will be described in more detail below with respect to FIG. 10.

Although FIG. 9 illustrates a particular arrangement of the client devices 906A-806N, the one or more networks 908, the service provider 902, and the one or more servers 904, various additional arrangements are possible. For example, the client devices 906A-806N may directly communicate with the one or more servers 904, bypassing the network 908. Or alternatively, the client devices 906A-806N may directly communicate with each other. The service provider 902 may be a public cloud service provider which owns and operates their own infrastructure in one or more data centers and provides this infrastructure to customers and end users on demand to host applications on the one or more servers 904. The servers may include one or more hardware servers (e.g., hosts), each with its own computing resources (e.g., processors, memory, disk space, networking bandwidth, etc.) which may be securely divided between multiple customers, each of which may host their own applications on the one or more servers 904. In some embodiments, the service provider may be a private cloud provider which maintains cloud infrastructure for a single organization. The one or more servers 904 may similarly include one or more hardware servers, each with its own computing resources, which are divided among applications hosted by the one or more servers for use by members of the organization or their customers.

Similarly, although the environment 900 of FIG. 9 is depicted as having various components, the environment 900 may have additional or alternative components. For example, the environment 900 can be implemented on a single computing device with the audio recommendation system 600. In particular, the audio recommendation system 600 may be implemented in whole or in part on the client device 902A.

As illustrated in FIG. 9, the environment 900 may include client devices 906A-806N. The client devices 906A-806N may comprise any computing device. For example, client devices 906A-806N may comprise one or more personal computers, laptop computers, mobile devices, mobile phones, tablets, special purpose computers, TVs, or other computing devices, including computing devices described below with regard to FIG. 10. Although three client devices are shown in FIG. 9, it will be appreciated that client devices 906A-806N may comprise any number of client devices (greater or smaller than shown).

Moreover, as illustrated in FIG. 9, the client devices 906A-806N and the one or more servers 904 may communicate via one or more networks 908. The one or more networks 908 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 908 may be any suitable network over which the client devices 906A-806N may access service provider 902 and server 904, or vice versa.

The one or more networks 908 will be discussed in more detail below with regard to FIG. 10.

In addition, the environment 900 may also include one or more servers 904. The one or more servers 904 may generate, store, receive, and transmit any type of data, including video input data 622, video features data 624, audio features data 626, audio catalog 628, and training data 630, or other information. For example, a server 904 may receive data from a client device, such as the client device 906A, and send the data to another client device, such as the client device 902B and/or 902N. The server 904 can also transmit electronic messages between one or more users of the environment 900. In one example embodiment, the server 904 is a data server. The server 904 can also comprise a communication server or a web-hosting server. Additional details regarding the server 904 will be discussed below with respect to FIG. 10.

As mentioned, in one or more embodiments, the one or more servers 904 can include or implement at least a portion of the audio recommendation system 600. In particular, the audio recommendation system 600 can comprise an application running on the one or more servers 904 or a portion of the audio recommendation system 600 can be downloaded from the one or more servers 904. For example, the audio recommendation system 600 can include a web hosting application that allows the client devices 906A-806N to interact with content hosted at the one or more servers 904. To illustrate, in one or more embodiments of the environment 900, one or more client devices 906A-806N can access a webpage supported by the one or more servers 904. In particular, the client device 906A can run a web application (e.g., a web browser) to allow a user to access, view, and/or interact with a webpage or website hosted at the one or more servers 904.

Upon the client device 906A accessing a webpage or other web application hosted at the one or more servers 904, in one or more embodiments, the one or more servers 904 can provide a user of the client device 906A with an interface to provide an input (e.g., a video sequence or a document/file including a video sequence), or an interface to select a portion of a video sequence. Upon receiving the input, the one or more servers 904 can automatically perform the methods and processes described above to determine an audio recommendation for the input video sequence. The one or more servers 904 can provide an output including one or more recommended audio sequences to the client device 906A for display to the user.

As just described, the audio recommendation system 600 may be implemented in whole, or in part, by the individual elements 902-808 of the environment 900. It will be appreciated that although certain components of the audio recommendation system 600 are described in the previous examples with regard to particular elements of the environment 900, various alternative implementations are possible. For instance, in one or more embodiments, the audio recommendation system 600 is implemented on any of the client devices 906A-806N. Similarly, in one or more embodiments, the audio recommendation system 600 may be implemented on the one or more servers 904. Moreover, different components and functions of the audio recommendation system 600 may be implemented separately among client devices 906A-806N, the one or more servers 904, and the network 908.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
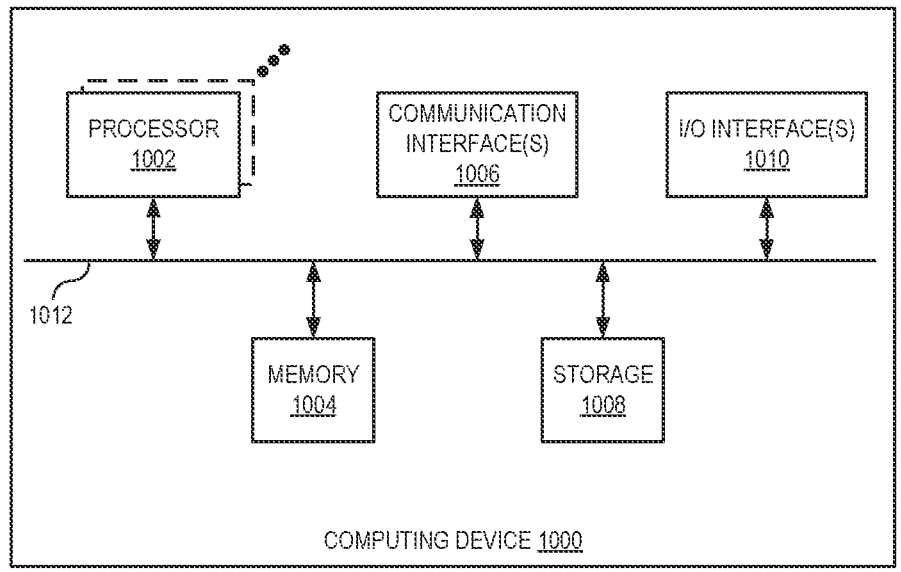
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that one or more computing devices such as the computing device 1000 may implement the audio recommendation system 600. As shown by FIG. 10, the computing device can comprise a processor 1002, memory 1004, one or more communication interfaces 1006, a storage device 1008, and one or more I/O devices/interfaces 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1008 and decode and execute them. In various embodiments, the processor(s) 1002 may include one or more central processing units (CPUs), graphics processing units (GPUs), field programmable gate arrays (FPGAs), systems on chip (SoC), or other processor(s) or combinations of processors.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 can further include one or more communication interfaces 1006. A communication interface 1006 can include hardware, software, or both. The communication interface 1006 can provide one or more interfaces for communication (such as, for example, packet-based communication) between the computing device and one or more other computing devices 1000 or one or more networks. As an example, and not by way of limitation, communication interface 1006 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

The computing device 1000 includes a storage device 1008 includes storage for storing data or instructions. As an example, and not by way of limitation, storage device 1008 can comprise a non-transitory storage medium described above. The storage device 1008 may include a hard disk drive (HDD), flash memory, a Universal Serial Bus (USB) drive or a combination these or other storage devices. The computing device 1000 also includes one or more input or output ("I/O") devices/interfaces 1010, which are provided to allow a user to provide input to (such as user strokes), receive output from, and otherwise transfer data to and from the computing device 1000. These I/O devices/interfaces 1010 may include a mouse, keypad or a keyboard, a touch screen, camera, optical scanner, network interface, modem, other known I/O devices or a combination of such I/O devices/interfaces 1010. The touch screen may be activated with a stylus or a finger.

The I/O devices/interfaces 1010 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1010 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
    receiving an input including a video sequence and a request to determine an audio sequence recommendation for the video sequence;
    analyzing the video sequence to determine frame level video features and video level video features of the video sequence;
    sending the frame level video features and the video level video features to an audio reasoning module to generate an audio vector for the video sequence; and
    determining the audio sequence recommendation for the video sequence by comparing the generated audio vector for the video sequence with stored audio vectors for a plurality of stored audio sequences.

2. The computer-implemented method of claim 1, wherein determining the audio sequence recommendation for the video sequence comprises:
    for each of the plurality of stored audio sequences, calculating a Euclidean distance between the generated audio vector for the video sequence and a stored audio vector for a stored audio sequence;
    sorting the plurality of stored audio sequences based on calculated Euclidean distances; and
    selecting the stored audio sequence with a smallest Euclidean distance as the audio sequence recommendation for the video sequence.

3. The computer-implemented method of claim 1, wherein analyzing the video sequence to determine the frame level video features and the video level video features of the video sequence comprises:
    generating the frame level video features of the video sequence by passing video frames extracted from the video sequence through a video classification model; and
    generating the video level video features of the video sequence by averaging the frame level video features.

4. The computer-implemented method of claim 1, wherein the audio reasoning module is trained using a training system configured to:
    obtain training video data, the training video data including a training video sequence and a training audio sequence embedded with the training video sequence;
    analyze training video frames from the training video sequence to determine training frame level video features and training video level video features of the training video sequence;
    analyze training audio frames from the training audio sequence to determine a ground truth audio vector for the training audio sequence;
    send the training frame level video features and the training video level video features to the audio reasoning module to generate a training audio vector for the training video sequence;
    calculate, using a loss function, a loss of the training audio vector and the ground truth audio vector; and
    train the audio reasoning module based on the loss.

5. The computer-implemented method of claim 4, wherein calculating the loss of the training audio vector and the ground truth audio vector comprises:
    calculating a triplet loss using the training audio vector, the ground truth audio vector, and a randomly selected catalog audio vector from an audio catalog database.

6. The computer-implemented method of claim 1, wherein the audio reasoning module is configured to:
    process the frame level video features through a first neural network to generate spatial features of the video sequence;
    process the frame level video features through a second neural network to generate temporal features of the video sequence;
    process the video level video features through a third neural network to generate global features of the video sequence;
    concatenate the spatial features, the temporal features, and the global features of the video sequence; and
    generating the generated audio vector by processing the concatenated spatial features, temporal features, and global features of the video sequence through a dense layer of the audio reasoning module.

7. The computer-implemented method of claim 6, wherein the first neural network is a spatial branch that uses the frame level video features to generate the spatial features of the video sequence, wherein the second neural network is a temporal branch that uses a transposed form of the frame level video features to generate the temporal features of the video sequence, and wherein the third neural network is a global branch that uses the video level video features to generate the global features of the video sequence.

8. A non-transitory computer-readable storage medium including instructions stored thereon which, when executed by at least one processor, cause the at least one processor to:
    receive an input including a video sequence and a request to determine an audio sequence recommendation for the video sequence;
    analyze the video sequence to determine frame level video features and video level video features of the video sequence;
    send the frame level video features and the video level video features to an audio reasoning module to generate an audio vector for the video sequence; and
    determine the audio sequence recommendation for the video sequence by comparing the generated audio vector for the video sequence with stored audio vectors for a plurality of stored audio sequences.

9. The non-transitory computer-readable storage medium of claim 8, wherein determining the audio sequence recommendation for the video sequence comprises:
for each of the plurality of stored audio sequences, calculating a Euclidean distance between the generated audio vector for the video sequence and a stored audio vector for a stored audio sequence;
sorting the plurality of stored audio sequences based on calculated Euclidean distances; and
selecting the stored audio sequence with a smallest Euclidean distance as the audio sequence recommendation for the video sequence.

10. The non-transitory computer-readable storage medium of claim 8, wherein analyzing the video sequence to determine the frame level video features and the video level video features of the video sequence comprises:
generating the frame level video features of the video sequence by passing video frames extracted from the video sequence through a video classification model; and
generating the video level video features of the video sequence by averaging the frame level video features.

11. The non-transitory computer-readable storage medium of claim 8, wherein the audio reasoning module is trained using a training system configured to:
obtain training video data, the training video data including a training video sequence and a training audio sequence embedded with the training video sequence;
analyze training video frames from the training video sequence to determine training frame level video features and training video level video features of the training video sequence;
analyze training audio frames from the training audio sequence to determine a ground truth audio vector for the training audio sequence;
send the training frame level video features and the training video level video features to the audio reasoning module to generate a training audio vector for the training video sequence;
calculate, using a loss function, a loss of the training audio vector and the ground truth audio vector; and
train the audio reasoning module based on the loss.

12. The non-transitory computer-readable storage medium of claim 11, wherein calculating the loss of the training audio vector and the ground truth audio vector comprises:
calculating a triplet loss using the training audio vector, the ground truth audio vector, and a randomly selected catalog audio vector from an audio catalog database.

13. The non-transitory computer-readable storage medium of claim 8, wherein the audio reasoning module is configured to:
process the frame level video features through a first neural network to generate spatial features of the video sequence;
process the frame level video features through a second neural network to generate temporal features of the video sequence;
process the video level video features through a third neural network to generate global features of the video sequence;
concatenate the spatial features, the temporal features, and the global features of the video sequence; and
generating the generated audio vector by processing the concatenated spatial features, temporal features, and global features of the video sequence through a dense layer of the audio reasoning module.

14. The non-transitory computer-readable storage medium of claim 13, wherein the first neural network is a spatial branch that uses the frame level video features to generate the spatial features of the video sequence, wherein the second neural network is a temporal branch that uses a transposed form of the frame level video features to generate the temporal features of the video sequence, and wherein the third neural network is a global branch that uses the video level video features to generate the global features of the video sequence.

15. A computer-implemented method comprising:
receiving, by a machine-learning backed service, a request to determine an audio sequence recommendation for a video sequence;
processing, by an audio reasoning module, frame level video features and video level video features of the video sequence to generate an audio vector representation of the video sequence;
determining the audio sequence recommendation for the video sequence using the generated audio vector representation of the video sequence; and
returning the determined audio sequence recommendation.

16. The computer-implemented method of claim 15, wherein processing the frame level video features and the video level video features of the video sequence to generate the audio vector representation of the video sequence comprises:
receiving an input including the video sequence;
analyzing the video sequence to determine the frame level video features and the video level video features of the video sequence; and
sending the frame level video features and the video level video features to the audio reasoning module.

17. The computer-implemented method of claim 16, wherein determining the audio sequence recommendation for the video sequence using the generated audio vector representation of the video sequence further comprises:
for each of a plurality of stored audio sequences, calculating a Euclidean distance between the generated audio vector representation of the video sequence and a stored audio vector for a stored audio sequence;
sorting the plurality of stored audio sequences based on calculated Euclidean distances; and
selecting the stored audio sequence with a smallest Euclidean distance as the audio sequence recommendation for the video sequence.

18. The computer-implemented method of claim 16, wherein analyzing the video sequence to determine the frame level video features and the video level video features of the video sequence further comprises:
generating the frame level video features of the video sequence by passing video frames extracted from the video sequence through a video classification model; and
generating the video level video features of the video sequence by averaging the frame level video features.

19. The computer-implemented method of claim 16, wherein the audio reasoning module is trained using a training system configured to:
obtain training video data, the training video data including a training video sequence and a training audio sequence embedded with the training video sequence;
analyze training video frames from the training video sequence to determine training frame level video features and training video level video features of the training video sequence;

analyze training audio frames from the training audio sequence to determine a ground truth audio vector for the training audio sequence;

send the training frame level video features and the training video level video features to the audio reasoning module to generate a training audio vector for the training video sequence;

calculate, using a loss function, a loss of the training audio vector and the ground truth audio vector; and train the audio reasoning module based on the calculated loss.

20. The computer-implemented method of claim 19, wherein calculating the loss of the training audio vector and the ground truth audio vector further comprises:

calculating a triplet loss using the training audio vector, the ground truth audio vector, and a randomly selected catalog audio vector from an audio catalog database.

* * * * *